US010621090B2

(12) United States Patent
Giamei et al.

(10) Patent No.: US 10,621,090 B2
(45) Date of Patent: Apr. 14, 2020

(54) FACILITY FOR EXTENDING EXCLUSIVE HOLD OF A CACHE LINE IN PRIVATE CACHE

(71) Applicant: INTERNATIONAL BUSINESS MACHINES CORPORATION, Armonk, NY (US)

(72) Inventors: Bruce C. Giamei, Poughkeepsie, NY (US); Christian Jacobi, Poughkeepsie, NY (US); Daniel V. Rosa, Poughkeepsie, NY (US); Anthony Saporito, Poughkeepsie, NY (US); Donald W. Schmidt, Poughkeepsie, NY (US); Chung-Lung K. Shum, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 521 days.

(21) Appl. No.: 15/404,247

(22) Filed: Jan. 12, 2017

(65) Prior Publication Data

US 2018/0196751 A1    Jul. 12, 2018

(51) Int. Cl.
*G06F 12/0808* (2016.01)
*G06F 12/0811* (2016.01)
(Continued)

(52) U.S. Cl.
CPC ........ *G06F 12/0808* (2013.01); *G06F 12/084* (2013.01); *G06F 12/0811* (2013.01);
(Continued)

(58) Field of Classification Search
CPC .... G06F 12/0808; G06F 9/52; G06F 12/0815; G06F 12/084; G06F 12/0842;
(Continued)

(56) References Cited

U.S. PATENT DOCUMENTS 4,225,921 A * 9/1980 Hartley et al. ................ 364/200
5,175,829 A * 12/1992 Stumpf et al. ............ G06F 9/00
                                                             395/375
(Continued)

FOREIGN PATENT DOCUMENTS

CN          100414518 C       8/2008
CN          101308462 A      11/2008
(Continued)

OTHER PUBLICATIONS

Guniguntala et al. ("The Read-Copy-Update Mechanism for Supporting Real-time Applications on Shared-memory Multiprocessor Systems with Linux", IBM Systems Journal), 2008, p. 2 (Year: 2008).*

(Continued)

*Primary Examiner* — Larry T Mackall
(74) *Attorney, Agent, or Firm* — Steven Chiu, Esq.; Kevin P. Radigan, Esq.; Heslin Rothenberg Farley & Mesiti P.C.

(57) ABSTRACT

A computing environment facility is provided to extend a hold of a cache line in private (or local) cache exclusively after processing a storage operand request. The facility includes determining whether a storage operand request to a storage location shared by multiple processing units of the computing environment is designated hold. In addition, a determination is made whether a state of the corresponding cache line in private cache used for processing the storage operand request is owned exclusively. Based on determining that the storage operand request is designated hold, and that the state of the corresponding cache line in private cache used for processing the storage operand request is owned exclusively, continuing to hold the corresponding cache line in the private cache exclusively after completing processing of the storage operand request. The continuing to hold may include initiating a counter to facilitate the continuing hold for a desired, set interval.

25 Claims, 13 Drawing Sheets

(51) Int. Cl.
  *G06F 12/084* (2016.01)
  *G06F 12/0842* (2016.01)
  *G06F 12/0891* (2016.01)
  *G06F 12/0815* (2016.01)

(52) U.S. Cl.
  CPC ...... *G06F 12/0815* (2013.01); *G06F 12/0842* (2013.01); *G06F 12/0891* (2013.01); *G06F 2212/1016* (2013.01); *G06F 2212/1024* (2013.01); *G06F 2212/6042* (2013.01)

(58) Field of Classification Search
  CPC ............ G06F 12/0811; G06F 12/0891; G06F 2212/1024; G06F 2212/6042; G06F 2212/1016
  See application file for complete search history.

(56) References Cited

U.S. PATENT DOCUMENTS

| | | | | |
|---|---|---|---|---|
| 5,623,632 | A | * | 4/1997 | Liu et al. ............. G06F 12/08 395/471 |
| 5,761,712 | A | * | 6/1998 | Tran et al. ............. G06F 12/00 711/126 |
| 5,963,974 | A | | 10/1999 | Arimilli et al. |
| 7,606,998 | B2 | | 10/2009 | Asher et al. |
| 8,683,129 | B2 | | 3/2014 | Ono et al. |
| 8,892,821 | B2 | | 11/2014 | Arimilli et al. |
| 2003/0037223 | A1 | * | 2/2003 | Steely, Jr. et al. ............. 712/28 |
| 2004/0006679 | A1 | | 1/2004 | Chiba et al. |
| 2008/0115042 | A1 | * | 5/2008 | Akkary et al. ........ H03M 13/51 714/806 |
| 2009/0019272 | A1 | | 1/2009 | Cypher et al. |
| 2009/0210675 | A1 | | 8/2009 | Alexander et al. |
| 2009/0216951 | A1 | | 8/2009 | Shum et al. |
| 2010/0058034 | A1 | | 3/2010 | Zaks |
| 2010/0205609 | A1 | | 8/2010 | Cypher |
| 2011/0093422 | A1 | * | 4/2011 | Chan ...................... G06F 17/00 706/46 |
| 2011/0276791 | A1 | | 11/2011 | Chaudhry et al. |
| 2012/0059996 | A1 | | 3/2012 | Habermann et al. |
| 2014/0115306 | A1 | | 4/2014 | Jacobi et al. |
| 2014/0229718 | A1 | | 8/2014 | Jackson et al. |
| 2014/0310480 | A1 | * | 10/2014 | Piry et al. ........... G06F 12/0831 711/146 |
| 2014/0380023 | A1 | | 12/2014 | Smaus et al. |
| 2015/0106597 | A1 | | 4/2015 | Godard et al. |
| 2015/0254104 | A1 | | 9/2015 | Kessler et al. |
| 2016/0019038 | A1 | | 1/2016 | Breternitz, Jr. et al. |
| 2016/0092236 | A1 | | 3/2016 | Kanapathipaillai et al. |
| 2016/0098361 | A1 | * | 4/2016 | Chandel .............. G06F 12/1458 |
| 2016/0328237 | A1 | | 11/2016 | Di et al. |
| 2017/0315806 | A1 | | 11/2017 | Mazumdar |

FOREIGN PATENT DOCUMENTS

| | | | | |
|---|---|---|---|---|
| CN | 102754069 | A | | 10/2012 |
| CN | 103714288 | B | | 5/2016 |
| EP | 1 857 927 | A2 | | 11/2007 |
| EP | 1857927 | A2 | * | 11/2007 ............... G06F 9/38 |
| JP | 3729087 | B2 | | 12/2005 |
| TW | 531711 | B | | 5/2003 |
| TW | 2016-10677 | A | | 3/2016 |
| WO | WO 2006031511 | A2 | | 3/2006 |
| WO | WO 2011101048 | A1 | | 8/2011 |

OTHER PUBLICATIONS

Shum, C. Kevin, "IBM z Systems Processor Optimization Primer," Mar. 2016, pp. 1-50.

Mel, Peter and Tim Grance, "The NIST Definition of Cloud Computing," National Institute of Standards and Technology, Information Technology Laboratory, Special Publication 800-145, Sep. 2011, pp. 1-7.

Stone et al., "Multiple Reservations and the Oklahoma Update", IEEE Parallel and Distributed Technology: Systems and Applications, vol. 1, No. 4, Nov. 2, 1993, pp. 58-71.

Khosraviani et al., "A Simple Lock Manager for Distributed Heterogeneous Systems", The 7th International Conference on IEEE, Networked Computing, Sep. 26, 2011, pp. 54-59.

Yasin et al., "A Top-Down Method for Performance Analysis and Counters Architecture", Performance Analysis of Systems and Software (ISPASS), 2014 IEEE International Symposium, (pp. 35-44).

Alvarez et al., "Hardware-Software Coherence Protocol for the Coexistence of Caches and Local Memories", 2015, IEEE Transactions on Computers, vol. 64, Issue No. 1, (pp. 152-165).

IBM, "z/Architecture Principles of Operation," IBM® Publication No. SA22-7832-10, Eleventh Edition, Mar. 2015, pp. 1-1732.

IBM, "Power ISA™ Version 2.07B," International Business Machines Corporation, Apr. 9, 2015, pp. 1-1527.

Giamei et al., "Temporarily Suppressing Processing of a Restrained Storage Operand Request", U.S. Appl. No. 15/404,254, filed Jan. 12, 2017 (50 pages).

Giamei et al., "List of IBM Patents and/or Patent Applications Treated as Related", U.S. Appl. No. 15/404,247, filed Jan. 12, 2017, dated Jan. 12, 2017 (2 pages).

* cited by examiner

FACILITATING PROCESSING WITHIN A COMPUTING ENVIRONMENT, INCLUDING:

- DETERMINING WHETHER A STORAGE OPERAND REQUEST TO A STORAGE LOCATION SHARED BY MULTIPLE PROCESSING UNITS OF A COMPUTING ENVIRONMENT IS DESIGNATED HOLD;

- ASCERTAINING WHETHER A STATE OF A CORRESPONDING CACHE LINE IN PRIVATE CACHE USED FOR PROCESSING THE STORAGE OPERAND REQUEST IS OWNED EXCLUSIVELY BY THE PROCESSING UNIT; AND

- BASED ON DETERMINING THAT THE STORAGE OPERAND REQUEST IS DESIGNATED HOLD, AND THAT THE STATE OF THE CORRESPONDING CACHE LINE IN PRIVATE CACHE USED FOR PROCESSING THE STORAGE OPERAND REQUEST IS OWN EXCLUSIVELY, CONTINUING TO HOLD THE CORRESPONDING CACHE LINE IN PRIVATE CACHE EXCLUSIVELY AFTER COMPLETING PROCESSING OF THE STORAGE OPERAND REQUEST, THE CONTINUING TO HOLD INCLUDING INITIATING A COUNTER TO FACILITATE THE CONTINUING HOLD FOR A DESIRED INTERVAL

~800

IN WHICH THE INITIATING INCLUDES INITIATING A SET INTERVAL FOR CONTINUED HOLDING OF THE CORRESPONDING CACHE LINE IN PRIVATE CACHE EXCLUSIVELY AFTER COMPLETING PROCESSING OF THE STORAGE OPERAND REQUEST, AND DISCONTINUING THE HOLDING OF THE CORRESPONDING CACHE LINE IN PRIVATE CACHE EXCLUSIVELY AFTER THE COUNTER REACHES THE SET INTERVAL

~805

IN WHICH A LENGTH OF THE SET INTERVAL IS DEPENDENT ON AN ACCESS TYPE OF THE STORAGE OPERAND REQUEST, THE ACCESS TYPE BEING FROM A GROUP CONSISTING OF FETCH-TYPE, STORE-TYPE AND UPDATE-TYPE

~810

IN WHICH THE LENGTH OF THE SET INTERVAL IS GREATER FOR THE STORE-TYPE AND THE UPDATE-TYPE THAN FOR THE FETCH-TYPE

FACILITY FOR EXTENDING EXCLUSIVE HOLD OF A CACHE LINE IN PRIVATE CACHE

BACKGROUND

One or more aspects relate, in general, to processing within a computing environment, and in particular to improving such processing.

In a multiprocessing computing environment, multiple processing units, such as central processing units (CPUs) or cores, are connected to share access to common storage, such as common main storage locations. The storage hierarchy across the configuration may include various cache levels private or local to each processing unit, various cache levels shared among several processing units, and main storage. When a processing unit is to update a storage location, a line of storage is transferred to the processing unit by the storage hierarchy, and the line is held exclusively within a cache level that is private to the processing unit performing the update. While a line of storage is held exclusively by a processing unit, other processing units are not permitted to update or read that line of storage, until after the line is released and no longer held exclusively by the processing unit.

Where several computer processes share access to an area of main storage, a semaphore (or lock) may be used to control access to that area of storage. The semaphore is typically a word or double word in main storage and the semaphore contents dictate which processing unit within the configuration currently is permitted access to the corresponding area of storage. When a process executing on a processing unit requires access to the storage area, that process updates the semaphore to indicate the shared area is in use, completes tasks that access the shared area, and then updates the semaphore again to indicate that the shared area is no longer in use.

SUMMARY

Certain shortcomings of the prior art are overcome and additional advantages are provided, in one or more aspects, through the provision of a computer program product for facilitating processing in a computing environment. The computer program product includes a storage medium readable by a processing unit and storing instructions for execution by the processing unit for performing a method. The method includes, for instance, determining whether a storage operand request to a storage location shared by multiple processing units of a computing environment is designated hold. In addition, the method includes ascertaining whether a state of a corresponding cache line in private cache used for processing the storage operand request is owned exclusively by the processing unit. Based on determining that the storage operand request is designated hold, and that the state of the corresponding cache line in private cache used for processing the storage operand request is owned exclusively, the method further includes continuing to hold the corresponding cache line in private cache exclusively after completing processing of the storage operand request. The continuing to hold includes initiating a counter to facilitate the continuing hold for a desired interval.

Advantageously, computer environment processing is enhanced by providing a facility (or capability) for a program to signal a processing unit that a specific storage operand request, or access, corresponding to a storage location shared by multiple processing units of the computing environment is designated hold. Based on identifying a specific storage operand request as hold, and based on the determining that a state of a corresponding cache line in private cache used for processing the storage operand request is owned exclusively, then the processing unit continues to hold for a desired interval the corresponding cache line in private cache exclusively after completing processing of the storage operand request. Thus, the processing unit may deviate from standard memory management protocols for the purpose of holding a cache line exclusively throughout the computing environment, for a longer duration than conventional, thereby increasing the probability of completing the process being run in the processing unit before releasing the cache line. This advantageously reduces the number of times a cache line containing a semaphore (or lock) potentially traverses the computing environment unproductively, thereby increasing overall system performance.

In one or more implementations, initiating the counter may include initiating a set interval for continued holding of the corresponding cache line in the private cache exclusively after completing processing of the storage operand request, and discontinuing the holding of the corresponding cache line in private cache exclusively after the counter reaches the set interval. In one or more embodiments, a length of the set interval is dependent on an access type the storage operand request, where the access type may be one of a fetch-type, store-type or update-type access. In specific embodiments, the length of the set interval may be greater for the store-type and update-type accesses than for the fetch-type access.

In one or more implementations, the set interval may be from a group consisting of a time-based interval and a cycle-based interval. Further, in one or more embodiments, the method may include determining an access type of the storage operand request, and based on determining that the access type is a fetch-type access, discontinuing the holding of the corresponding cache line in private cache exclusively based on the counter reaching the set interval.

In certain embodiments, the method may further include determining an access type of the storage operand request, and based on the access type being a store-type or update-type, the method may include determining whether a subsequent storage operand request is designated release for the corresponding cache line. Based on the subsequent storage operand request being designated release, the method may include discontinuing the holding of the corresponding cache line in private cache exclusively. Further, initiating the counter may include initiating a set interval for the continued holding of the corresponding cache line in private cache exclusively after completing processing of the storage operand request. In addition, discontinuing the holding of the corresponding cache line may occur upon the earlier of the counter reaching the set interval or receiving a subsequent storage operand request designated release for the corresponding cache line.

In one or more implementations, any cache invalidate commands from a system control of the computing environment for the corresponding cache line in private cache will be rejected during the continuing to hold the corresponding cache line in private cache exclusively after completing processing of the storage operand request.

In another aspect, a computer system for facilitating processing within a computing environment is provided. The computer system includes a memory, and a processing unit communicatively coupled with a memory, wherein the computer system is configured to perform a method. The method includes, for instance, determining whether a storage operand request to a storage location shared by multiple processing units of a computing environment is designated hold. In addition, the method includes ascertaining whether a state of a corresponding cache line in private cache used for processing the storage operand request is owned exclusively by the processing unit. Based on determining that the storage operand request is designated hold, and that the state of the corresponding cache line in private cache used for processing the storage operand request is owned exclusively, the method further includes continuing to hold the corresponding cache line in private cache exclusively after completing processing of the storage operand request. The continuing to hold includes initiating a counter to facilitate the continuing hold for a desired interval.

In a further aspect, a computer-implemented method of facilitating processing within a computing environment is provided. The computer-implemented method includes, for instance, determining by a processing unit whether a storage operand request to a storage location shared by multiple processing units of a computing environment is designated hold. In addition, the method includes ascertaining whether a state of a corresponding cache line in private cache used for processing the storage operand request is owned exclusively by the processing unit. Based on determining that the storage operand request is designated hold, and that the state of the corresponding cache line in private cache used for processing the storage operand request is owned exclusively, the method further includes continuing to hold the corresponding cache line in private cache exclusively after completing processing of the storage operand request. The continuing to hold includes initiating a counter to facilitate the continuing hold for a desired interval.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 8A & 8B depict a further example of storage operand request-related processing, in accordance with one or more aspects of the present invention;

DETAILED DESCRIPTION

Figure 1:
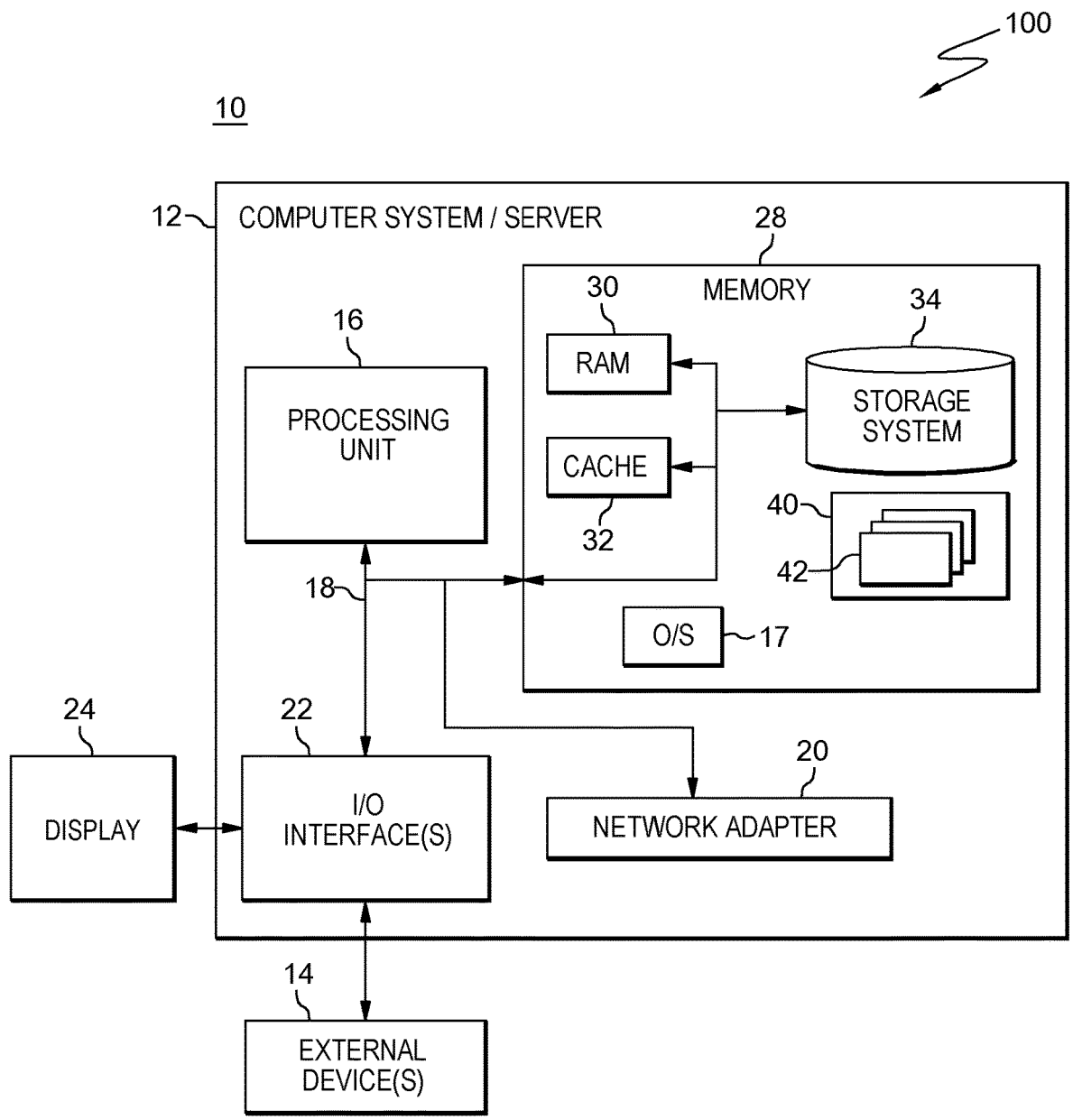
FIG. 1 depicts one example of a computing environment to incorporate and use one or more aspects of the present invention.

As noted, processing unit features intended to enhance individual processing unit performance, such as pipelining, superscalar, out-of-order execution, and branch prediction, may result in speculative memory requests. Speculative requests to private storage locations can be advantageous, but excessive speculative requests to common storage locations can be detrimental to semaphore (or lock) processing.

Contention among processing units for a semaphore to control a common shared storage location increases as: the number of speculative memory requests increases by the processing units in the computing environment (or computing configuration), the number of processing units in the computing environment increases, or potentially based on memory subsystem topology, etc. As contention among processing units increases, it becomes increasingly more difficult for each individual processing unit to successfully obtain and hold a line of storage containing a particular shared memory location. Therefore, overall system performance may degrade.

For instance, as multiple processing units attempt to update a storage location corresponding to a semaphore, system controls may broadcast cache invalidate commands to all processing units in the computing environment, including the processing unit currently holding the line of storage, which may contain the semaphore in an exclusive state. Standard memory management protocols may cause the processing unit, currently executing a process owning the lock to release the exclusive ownership of the line, before the process can complete all tasks and before the process can update the lock to indicate that the shared area is no longer in use. In this case, the processing unit will need to later retrieve the line exclusively again in order to finish the process. In view of this, a cache line containing a semaphore may frequently be traversing the computing environment, without benefitting any individual process.

In accordance with one or more aspects of the present invention, a facility is provided for a program to signal a processing unit that a specific storage operand access corresponds to a common storage location containing a semaphore (or lock) and is to have an extended hold. When signaled, the processing unit may deviate from standard memory management protocols for the purpose of holding a cache line exclusively, throughout the computing environment, for a longer duration than conventional, thereby increasing the probability of completing the process being run on the processing unit before releasing the cache line. As a result, the number of times the cache line, containing the semaphore traverses the computing environment unproductively is reduced, thereby increasing system performance.

One embodiment of a computing environment to incorporate and use one or more aspects of the present invention is described with reference to FIG. 1. In one example, the computing environment may be based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

As shown in FIG. 1, a computing environment 100 includes, for instance, a node 10 having, e.g., a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in many computing environments, including but not limited to, distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system 17, one or more application programs, other program modules, and program data. Each of the operating system, one or more application programs, other program modules, and program data or some combination thereof, may include an implementation of a networking environment. Program modules 42 may generally carry out the functions and/or methodologies of one or more embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As an example, processing unit 16 may include a plurality of functional components used to execute instructions. These functional components may include, for instance, an instruction fetch component to fetch instructions to be executed; an instruction decode unit to decode the fetched instructions; instruction execution components to execute the decoded instructions; a memory access component to access memory for instruction execution, if necessary; and a write back component to provide the results of the executed instructions. One or more of these components may, in accordance with an aspect of the present invention, be used to implement deviations from typical memory management protocols with respect to a cache line corresponding to a storage-operand request identified as hold, and resuming typical memory management protocols with respect to a cache line corresponding to a storage-operand request identified as release, as described further below.

Processing unit 16 also includes, in one embodiment, one or more registers to be used by one or more of the functional components.

Another example of a computing environment to incorporate and use one or more aspects of the present invention is described with reference to FIG. 2. In one example, the computing environment may again be based on the above-referenced z/Architecture, offered by International Business Machines Corporation, Armonk, N.Y. In another example, the computing environment may be based on the above-referenced Power Architecture, offered by International Business Machines Corporation, Armonk, N.Y. The computing environment may also be based on other architectures, including, but not limited to, the Intel 64 and IA-32 architectures. Other examples also exist.

Figure 2:
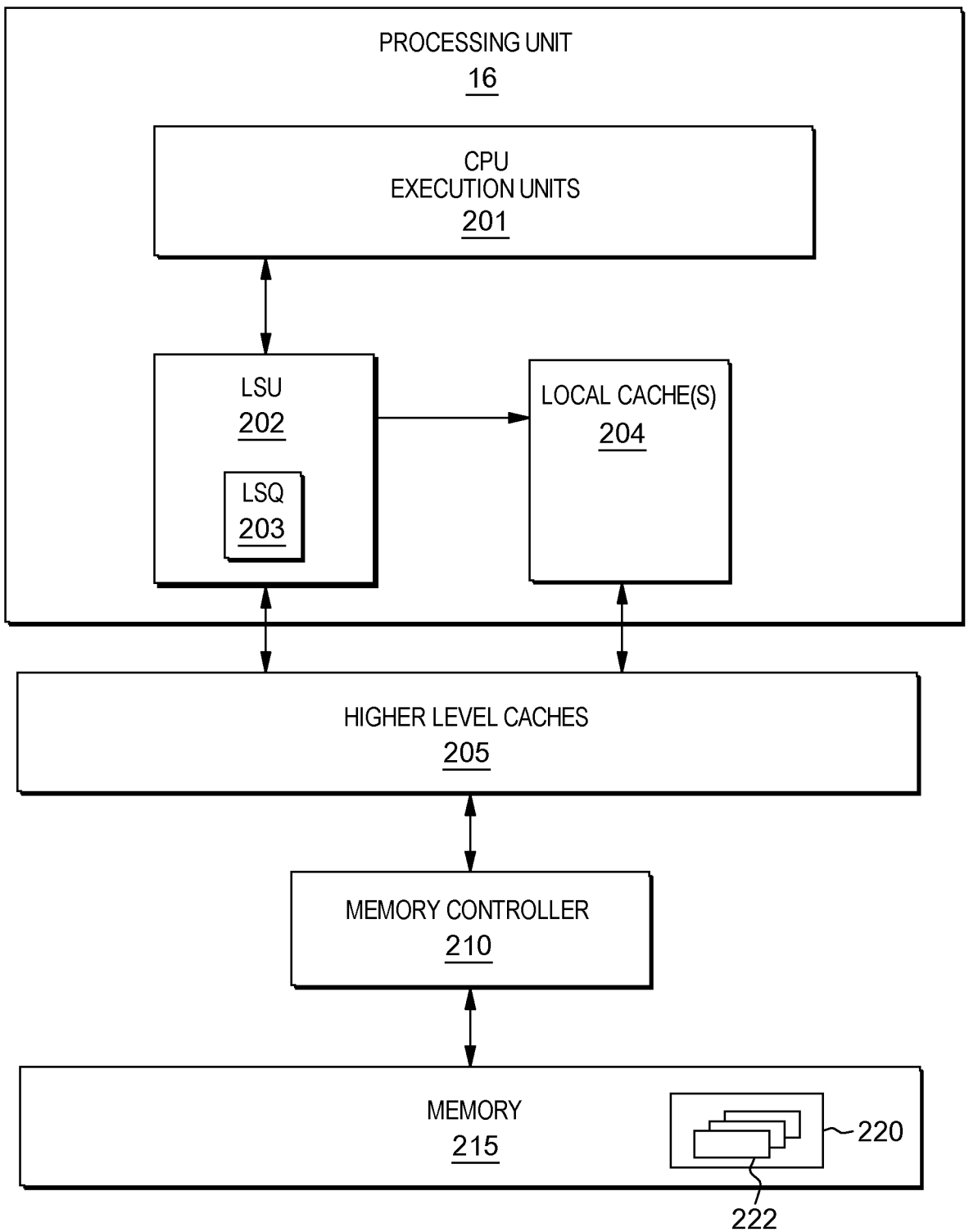
FIG. 2 depicts a further example of a computing environment to incorporate and use one or more aspects of the present invention.

Referring to FIG. 2, in one example, a computing environment 200 includes at least one processing unit (PU), such as a central processing unit (CPU), coupled to one or more higher level caches 205. Central processing unit 16 includes, for instance, one or more execution units 201 to request and consume data. Execution units 201 are coupled to a load/store unit (LSU) 202, which includes a load/store queue (LSQ) 203. Load/store unit 202 issues memory access operations (loads and stores) that retrieve prefetched data or cause the data to be fetched from the memory subsystem or higher level caches. LSU 202 may be coupled to a local (or private) cache(s) 204 via, e.g., a translation mechanism, such as, e.g., a translation look-aside buffer (TLB) or an effective-to-real address translation table (ERAT).

Processing unit 16 is coupled to and communicates with a memory hierarchy that includes, for instance, local (or private) cache(s) 204, which may include an L1 data cache; one or more higher level caches 205, which may include a single level two (L2) cache or multiple other sequentially numbered higher levels, e.g., L3, L4; a memory 215; and an associated memory controller 210, which controls accesses to memory 215. Local cache(s) 204 serves as a prefetch buffer for data (and/or data streams) that are prefetched. Local cache(s) 204 has a corresponding load miss queue (LMQ), which the cache utilizes to save information about ongoing prefetch requests.

Further, in one embodiment, local cache(s) 204 may have an associated cache directory, which may be implemented as part of the cache or be maintained separate therefrom. The cache directory may include a tag for each cache line in the local cache. The tag provides information about the cache line, including at least part of a real or absolute address of the data in the cache line, as well as status information, such as whether the data is being held exclusive or shared, etc.; the use of the data, such as whether it is most recently used, least recently used, or somewhere in between, etc.; and/or other status information. The tag may also include additional information regarding the data in the cache line. Each cache level may have an associated cache directory, either its own directory or a shared directory.

In addition to the example memory hierarchy, computing environment 200 may also include additional storage devices that form a part of the memory hierarchy from the perspective of processing unit 16. The storage devices may be one or more electronic storage media, such as a floppy disk, hard drive, CD-ROM, or DVD. CPU 102 communicates with each of the above devices within the memory hierarchy by various mechanisms, including via buses and/or direct channels, as examples.

The buses may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Video Electronics Standards Association (VESA) local bus, and Peripheral Component Interconnect (PCI) bus.

Figure 3:
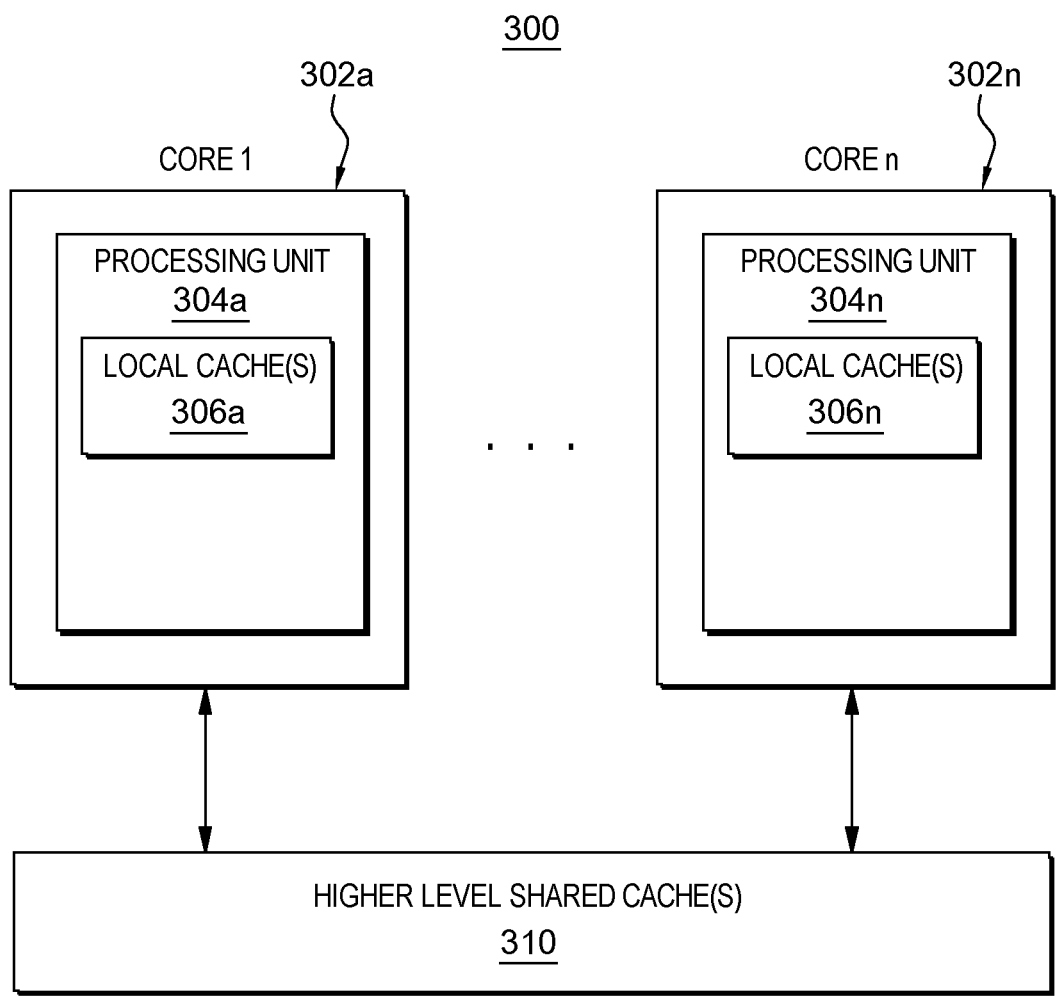
FIG. 3 depicts one example of a multiprocessing unit environment to incorporate and use one or more aspects of the present invention.

In a further embodiment, the processing disclosed herein may be used in a multiprocessor environment, such as the one described below with reference to FIG. 3. In one example, a multiprocessor environment 300 includes a plurality of cores 302a . . . 302n. Each core includes at least one hardware thread or processing unit 304a, 304n that includes a local (or private) cache, such as an L1 cache 306a, 306n. Each core 302a, 302n is coupled to zero or more higher level private caches (e.g., L2 cache(s)). Additionally, multiprocessor environment 300 includes zero or more shared caches 310, such as L3 and/or L4 caches, which are shared between the cores, and more particularly, shared among the processing units. Other topologies may also exist.

Each processing unit in the multiprocessor environment (or a subset of the processing units) may also include a query function to be used to query one or more of the caches, including one or more of the shared cache(s), if available, to obtain cache residency status and/or other information of selected data.

Figure 4:
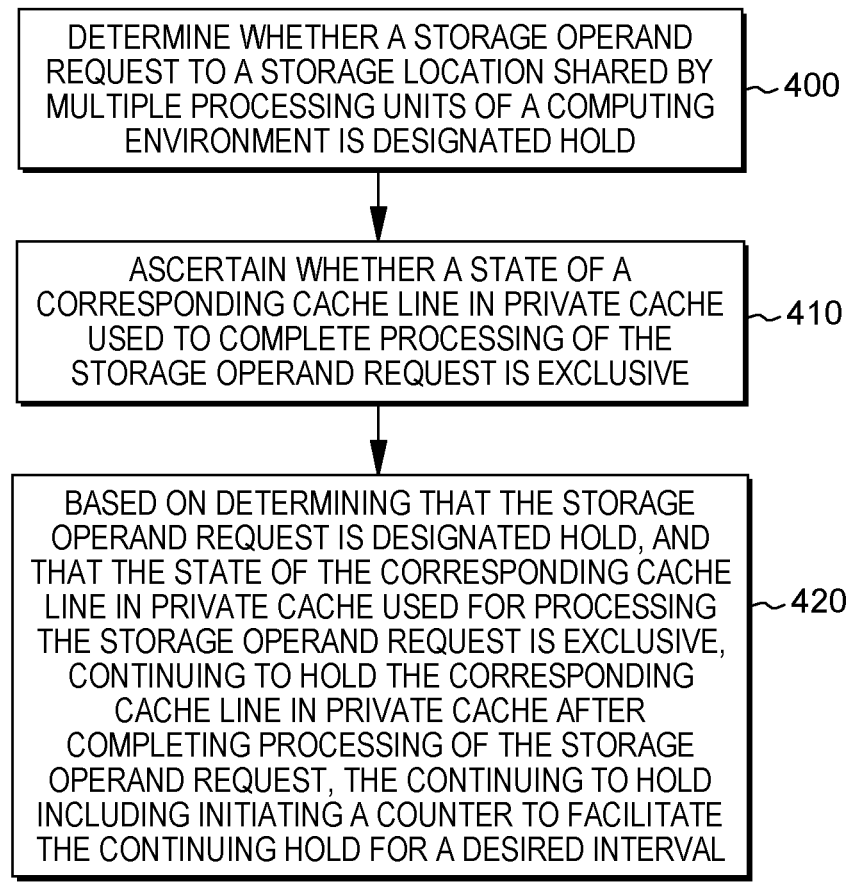
FIG. 4 depicts one embodiment of storage operand request-related processing, in accordance with one or more aspects of the present invention.

As noted, in accordance with one or more aspects of the present invention, a facility is provided herein for enhancing processing within a computing environment. As illustrated in FIG. 4, the facility may include a capability to determine whether a storage operand request to a storage location shared by multiple processing units of a computing environment is designated hold 400. In addition, the facility may include ascertaining whether a state of a corresponding cache line in private cache used for processing the storage operand request is owned exclusively 410. Based on determining that the storage operand request is designated hold, and that the state of the corresponding cache line in private cache used for processing the storage operand request is owned exclusively, the facility includes continuing to hold the corresponding cache line in the private cache exclusively after completing processing of the storage operand request 420. The continuing to hold may include initiating a counter to facilitate the continuing hold for a desired interval.

In one or more implementations, initiating the counter may include initiating a set interval for continued holding of the corresponding cache line in the private cache exclusively after completing processing of the storage operand request, and discontinuing the holding of the corresponding cache line in private cache exclusively after reaching the set interval. In one or more embodiments, a length of the set interval may be dependent on an access type of the storage operand request. The access type may be, for instance, a fetch-type, a store-type or update-type access. In certain embodiments, the length of the set interval may be greater for a store-type access or an update-type access than for fetch-type access. By way of example, the set interval may be a time-based interval or a cycle-based interval, and the continuing hold of the corresponding cache line may be released upon the counter counting down (or up) to the set count interval.

In one or more implementations, the facility may include determining an access type of the storage operand request, and based on determining that the access-type is a fetch-type access, the exclusive holding of the corresponding cache line in private cache may be released based on the counter reaching the set count interval.

In one or more embodiments, the facility may determine an access-type of the storage operand request, and based on the access-type being a store-type or an update-type, further determine whether a subsequent operand request is designated release for the corresponding cache line. Based on the subsequent storage operand request being designated release, the exclusive hold on the corresponding cache line in private cache is discontinued. In addition, initiating the counter may include initiating a set interval for continuing holding of the corresponding cache line in the private cache exclusively after completing processing of the storage operand request, and discontinuing the holding of the corresponding cache line upon the earliest of the subsequent storage operand request being designated release, or the counter reaching the set count interval.

In one or more embodiments, any cache invalidate commands (e.g., from a system control of the computing environment) for the corresponding cache line in the private cache are rejected during the continuing hold of the corresponding cache line in private cache exclusively after completing processing of the storage operand request.

Figure 5A:
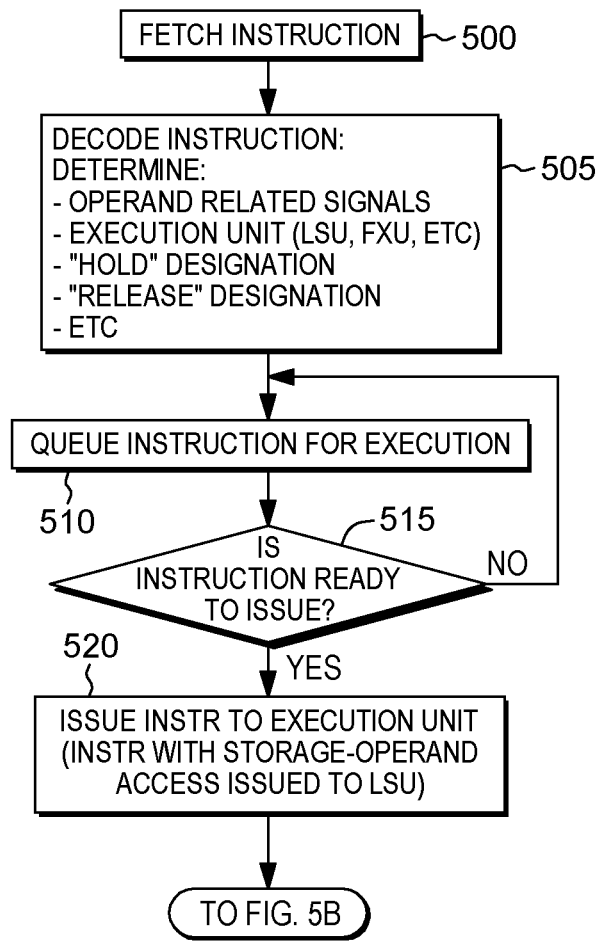
FIGS. 5A & 5B depict a more detailed example of storage operand request-related processing, in accordance with one or more aspects of the present invention.
Figure 5B:
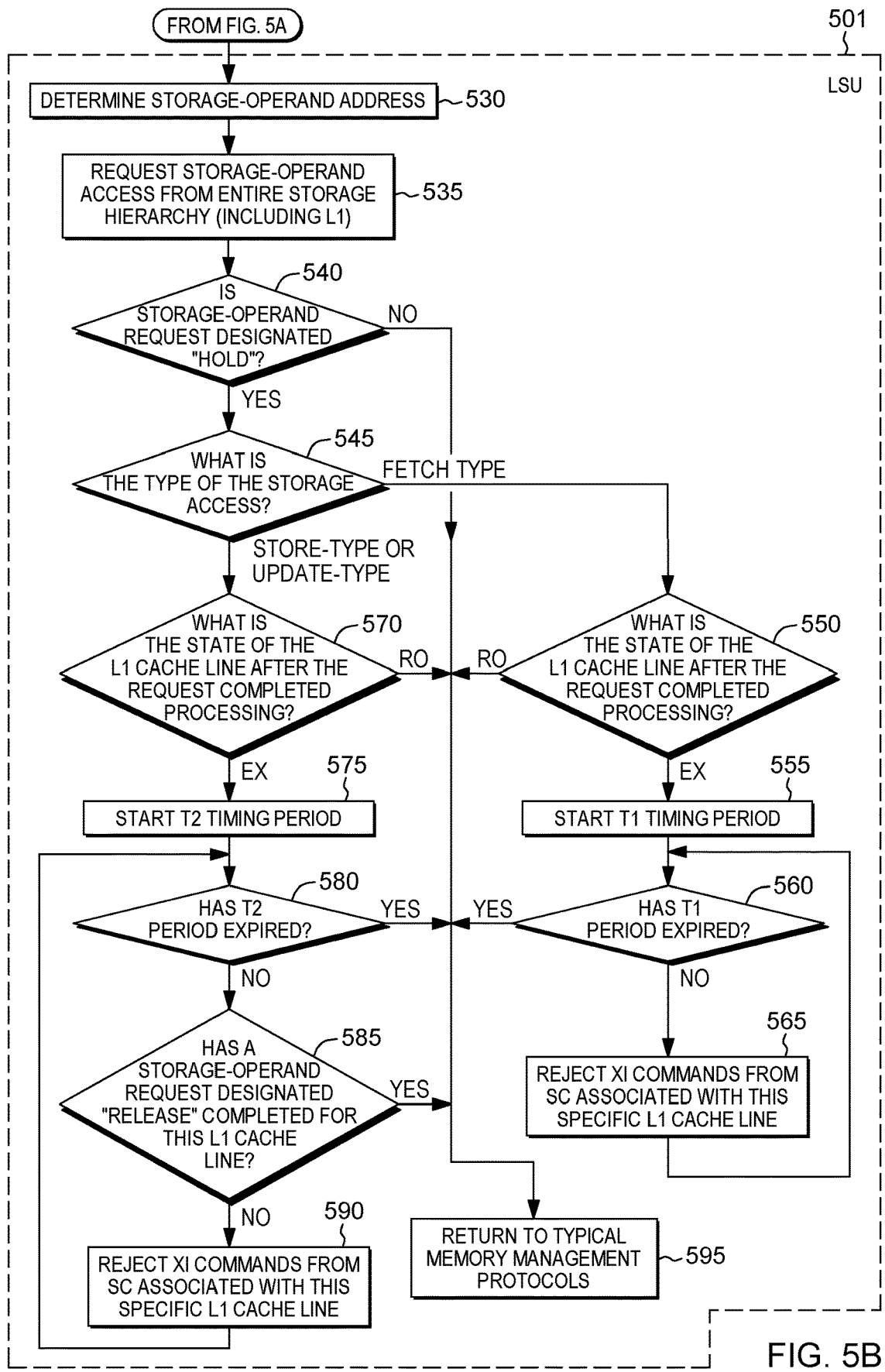

FIGS. 5A & 5B depict a more detailed embodiment of process flow in accordance with one or more aspects of the present invention. Referring first to FIG. 5A, a processing unit may fetch an instruction 500, and decode the instruction to determine, for instance, operand related signals, an execution unit (LSU, FXU, etc.), a "hold" designation, a "release" designation, etc. 505. As noted, the capability to provide the hold designation, and a release designation, may be implemented in an instruction set architecture (ISA), an example which is described below with reference to FIGS. 6A-7.

The instruction is queued for execution 510, and the processing unit determines whether the instruction is ready to issue 515. If "no", then the instruction remains in the queue 510. Otherwise, the instruction is issued to the execution unit 520. In this example, the instruction is assumed to include a storage operand request or access and is issued to the load store unit (LSU) 501 (FIG. 5B) for processing.

Referring to FIG. 5B, LSU 501 determines the storage operand address 530, and requests storage operand access from the entire storage hierarchy (including private cache to the processing unit, such as L1 cache) 535.

In the implementation depicted, LSU 501 determines whether the storage operand request is designated as hold 540. If "no", then standard memory management protocols 595 are employed in processing the storage operand request. If "yes", then LSU 501 determines the type of storage access 545. In the example depicted, the type of storage access of interest may involve a fetch-type access, or alternatively, a store-type access or update-type access associated with the storage operand request.

Assuming that there is a fetch-type access, processing determines a state of the private cache line after the request completes processing 550. The state is either read-only (RO) or exclusive (EX). If read-only, then LSU 501 continues with standard memory management protocols 595. However, if the corresponding cache line in private cache is held exclusive (EX), then a counter is initiated to facilitate holding of the cache line for a desired (or set) interval. In particular, in one or more implementations, a timer may start a timing period T1 555. Note that in one or more other embodiments, a cycle-based interval may be used rather than a time-based interval.

LSU 501 determines whether time period T1 has expired 560, and if "no", then continues to exclusively hold the corresponding cache line in private cache by, for instance, rejecting any cache invalidate (XI) commands from a system control (SC) associated with the specific private cache line 565. Once the timing period or interval has expired, then processing returns to standard memory management protocols 595. Note that during the extended hold interval, processing of the storage operand request may have completed, but processing of the instruction with which the request is associated may not have completed, and thus, the facility disclosed provides the program with the option to continue the hold of the cache line longer than would otherwise be conventionally performed. By way of specific example, this processing may be advantageous where the instruction is a load and test instruction, as discussed below.

Returning to inquiry 545, where the type of storage access is a store-type or update-type access, then processing determines the state of the private cache line after the request completes processing 570. If read-only (RO), processing returns to the standard memory protocols 595. If exclusive (EX), a counter is initiated to facilitate continuing to exclusively hold the corresponding cache line in the private cache for a desired interval. In a time-based interval example, this may involve starting a T2 timing period or interval 575. Note that, in one or more embodiments, timing period T2 may be significantly larger than timing period T1. Note also that, in one or more other embodiments, a cycle-based interval may be used rather than a time-based interval.

LSU 501 next determines whether timing period T2 has expired 580, and if "yes", returns to standard memory management protocols 595, releasing the hold of the corresponding cache line. If timing period T2 has not expired, then processing determines whether a subsequent storage operand request designated release has completed for the corresponding (e.g., L1) cache line 585. If "yes", then processing returns to the standard memory management protocols 595. If "no", LSU 501 rejects any cache invalidate (XI) commands from system control(s) associated with the specific private (e.g., L1) cache line 590, and returns to determine whether timing period T2 has expired 580.

Figure 6A:
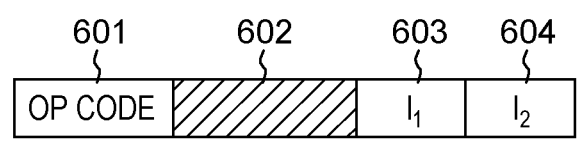
FIG. 6A illustrates one embodiment of an instruction format useful in accordance with one or more aspects of the present invention.
Figure 6B:
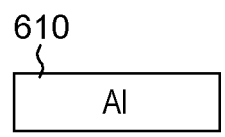
FIG. 6B illustrates one embodiment of an access intent control field of an instruction format such as depicted in FIG. 6A, in accordance with one or more aspects of the present invention.
Figure 7:
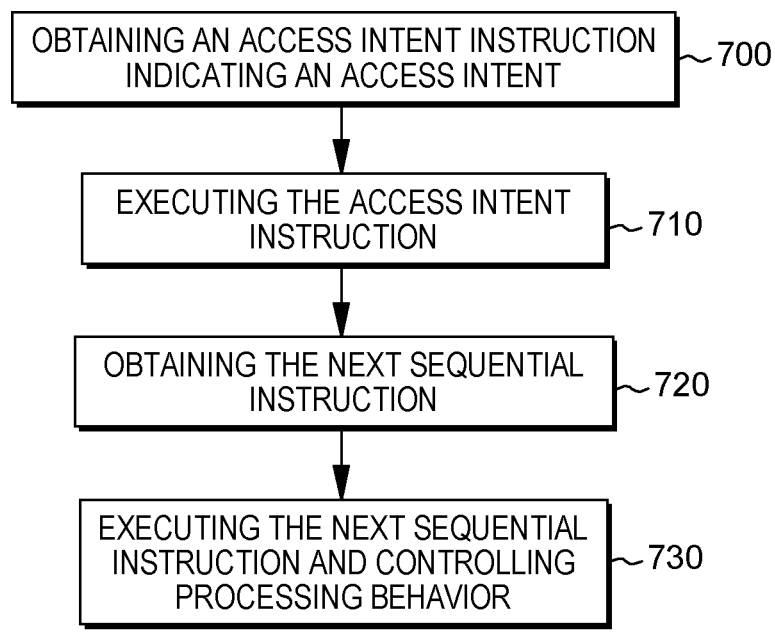
FIG. 7 illustrates an embodiment of a flow diagram which may be used in controlling processing behavior using an instruction such as depicted in FIGS. 6A & 6B, in accordance with one or more aspects of the present invention.

One embodiment of an instruction format which may be used in accordance with one or more embodiments of the present invention is described below with reference to FIGS. 6A-7. In FIG. 6A, an instruction format is depicted known as a Next Instruction Access Intent (NIAI) instruction. This instruction format may include an operation code field 601 indicating that this is a next instruction access intent instruction. Additionally, a reserved field 602 may be provided, which in one or more embodiments may contain zeros. The instruction format may also include fields or operands, such as an access intent control field 603 ($I_1$), and another access intent control field 604 ($I_2$).

For this instruction format, the term primary-access operand means the lowest numbered storage operand of an instruction. Similarly, the term secondary-access operand means the next lowest numbered storage operand of the instruction. These terms do not have the same meaning as the terms first operand and second operand, even though there may be some correlation.

Subject to the controls in the $I_1$ 603 and $I_2$ 604 fields, the CPU is signaled to future access intent for either or both the primary-access and the secondary-access operands of the next sequential instruction. The next sequential instruction may be the instruction retrieved and executed after the NIAI instruction. The $I_1$ 603 field may contain a code to signal the CPU the access intent for the primary-access operand of the next sequential instruction. The $I_2$ 604 field may contain a code to signal the CPU the access intent for the secondary-access operand of the next sequential instruction. When the next sequential instruction has only a single storage operand, the $I_2$ 604 field may be ignored.

One embodiment of an instruction format may include a single access intent field. Another embodiment of an instruction format may include two access intent fields. Another embodiment of instruction format may include multiple access intent fields. Still another embodiment of instruction format may include a field or operand that contains a value specifying the number of subsequent next sequential instructions. The access intent control fields $I_1$ 603 and $I_2$ 604 may have format 610 such as depicted in FIG. 6B, where a set number of bits of the $I_1$ 603 and $I_2$ 604 fields contain an unsigned integer that is used as a code to signal the CPU the access intent for the corresponding operand of the next sequential instruction.

In accordance with one or more aspects of the present invention, new access intent codes may be provided for, for instance, the Next Instruction Access Intent instruction to allow a program and processing unit to extend a hold of a cache line associated with a storage location of a operand reference through the storage hierarchy if obtained exclusively. The hold may be any extended interval such as a desired period of time, compared with typical or conventional storage operand protocols. In this manner, a program using a shared storage resource is provided with the ability to obtain additional time for further progress before potentially losing control of a shared storage resource to another processing unit in the computing environment, where multiple processing units share a storage area. Additionally, if the access intent control field contains a different, set value (indicative of a release), then the processing unit may terminate the extended period of time in which the cache line is held exclusively throughout the storage hierarchy (i.e., where the extended period of time was initiated by a prior pair of instructions that included a next instruction access intent with a code designated as hold). In this case, the intent is to relinquish control of the shared storage resource for other processing units to utilize. By way of specific example only, the access intent control field for a hold value may be, for instance, a value 8, where the corresponding operand reference of the next sequential instruction is for a common storage area in a multiprocessing environment. Additionally, the access intent control field for a release value may be, for example, a value 7, where the corresponding operand reference of the next sequential instruction is for a common storage area in a multiprocessing environment.

As noted, by using the hold and release values in the control field(s), it is possible to mitigate unnecessary operations in the storage subsystem. An access intent control field designated "hold" may be used for operand references of fetch-type, store-type, or update-type. The extended interval a cache line may be held exclusively as a result of using access intent hold value may be significantly longer for storage-type and update-type operands than for fetch-type operands. When the program uses an access intent value "hold" with a corresponding store-type or update-type operand (signaling the processing unit to hold a specific cache line), and the cache line is successfully updated, the program may later explicitly terminate the exclusive hold by using a subsequent next instruction access intent instruction specifying an access intent "release" value with a corresponding store-type or update-type operand referencing the same specific cache line.

Where the program uses an access intent hold value with a corresponding fetch-type operand, signaling the processing unit to hold the specific cache line exclusively, the processing unit determines when to terminate the hold without any further directive from the program, as explained herein.

When the program uses an access intent hold value with a corresponding operand reference that conditionally updates the storage location, and the condition qualifying the storage update is not satisfied, the processing unit does not hold the corresponding cache line exclusively throughout the storage hierarchy for an extended period of time. The compare and swap instruction is an example of a storage operand reference that conditionally updates a storage location. Note that the operand corresponding to an access intent release value should be a store-type or an update-type operand. Further, access intent hold or release values may be used with the primary access operand, as specified by the $I_1$ field.

A specific example of using the next instruction access intent instruction with access intent hold and release values, when a semaphore assist (or lock assist) is used, is described below. Advantageously, contention is reduced among multiple CPU's in a multiprocessing configuration for a shared storage area using these access intent values.

| LOCKTEST | BCR | 14, 0 | Perform serialization before fetching lock. |
|---|---|---|---|
| | NIAI | 8, 0 | NIAI-hold Attempt to hold LOCKADDR cache line locally, long enough to obtain lock, if lock available. Avoid speculative load and test (LT) operand request if LOCKADDR not in local cache. |
| | LT | 1.LOCKADDR | Fetch lock from storage into GR1. Test Lock value: if CC = 0, then GR1 = 0 and lock available. Fetch-type operand: no subsequent NIAI-release required. May or may not obtain LOCKADDR exclusively into local cache. |
| | BRNZ | LOCKTEST | If CC nonzero, lock not yet available: branch back and retry, |

-continued

| | | | |
|---|---|---|---|
| LOCKAVAIL | NIAI | 8, 0 | NIAI-hold<br>Attempt to hold LOCKADDR cache line locally for a relatively long time, if successfully obtain lock, to execute many instructions before releasing the lock.<br>Avoid speculative compare and swap (CS) operand request if LOCKADDR not in the local cache. |
| | CS | 1, 5, LOCKADDR | If CC = 0: lock = GR1 = 0 still: store new lock value<br>Update-type operand subsequent NIAI-release required<br>If CC = 1: lock no longer available: no storage modification.<br>No subsequent NIAI-release required.<br>Serialization performed before and after operation. |
| LOCKACQUIRED | BRNZ | LOCKTEST | If CC = 1, a different CPU obtained lock before this CPU could: branch back and retry. |
| | . | | |
| | . | | |
| | . | | |
| LOCKRELEASE | NIAI | 7, 0 | NIAI-release<br>Terminate extended hold of LOCKADDR in local cache initiated by CS that successfully obtained lock control.<br>Avoid speculative MVHI operand request in the event LOCKADDR is no longer in local cache. |
| | MVHI | LOCKADDR, 0 | Release lock. |
| | BCR | 14, 0 | Perform serialization after releasing lock. |

In the above material, an example of augmenting a program, consisting of lock and unlock functions, with the use of access intent hold and release values, in a next instruction access intent (NIAI) instruction is provided. The example demonstrates locations within a program that may use a next instruction access intent instruction, and explains the benefits. The above example includes several assumptions.

For instance, the symbolic address LOCKADDR is the storage location for the header of the resource, which contains the lock word. When the lock is zero, the lock and resource are available. When the lock is nonzero, the lock and resource are not available, with LOCKADDR being a storage location frequently referenced by multiple CPUs.

Further, general register 5 contains a nonzero value, such as the CPU ID, to be used as a lock value.

Note that the use of the NIAI instruction in the above example results in: avoiding speculative queries for the operand reference of the LT instruction to the storage hierarchy external to the CPU's local cache levels, thereby eliminating unnecessary queries throughout the storage subsystem; holding the cache line, corresponding to the operand reference of the LT instruction, exclusively by the CPU's local cache, if obtained exclusively, long enough to set the lock, if the lock is available. Note that since the NIAI-hold corresponds to a fetch-type operand reference, a subsequent NIAI-release is not required.

Regarding the use of the NIAI instruction associated with the compare and swap instruction, note that: speculative queries for the operand reference of the CS instruction to the storage hierarchy external to the CPU's local cache level are avoided, in the event that the corresponding cache line has not already been obtained exclusively, thereby eliminating unnecessary queries throughout the storage subsystem; the objective is to hold the cache line (corresponding to the operand reference of the CS's instruction) exclusively in the CPU's local cache for a relatively long extended period of time, in order to execute many instructions between the programs labeled LOCKACQUIRED and LOCKRELEASE; when the resulting condition code of the CS instruction is 0, the storage location LOCKADDR is updated, and the CPU attempts to hold the cache line corresponding to LOCKADDR exclusively for the extended period of time, and it is expected that the program will use a subsequent NIAI-release corresponding to LOCKADDR to terminate the extended hold of the cache line; and when the resulting condition code of the CS instruction is 1, the content of storage at location LOCKADDR is not modified, and the CPU does not hold the cache line corresponding to the LOCKADDR for an extended period of time, and subsequent NIAI-release corresponding to the LOCKADDR is not required.

Regarding the use of the NIAI instruction associated with the MVHI instruction, note that: speculative queries for the operand reference of the MVHI instruction to the storage hierarchy external to the CPU's local cache are avoided, in the event the corresponding cache line is no longer held exclusively, thereby eliminating unnecessary queries throughout the storage subsystem; and the extended period of time the CPU attempts to hold the cache line, corresponding to LOCKADDR, exclusively, is terminated.

Note that, one or more instructions may be added to the program, between the first BRNZ instruction and the LOCKAVAIL program label, without jeopardizing the intended benefit of using the NIAI instruction associated with the LT instruction if: only a few instructions are added; and none of the instructions added encounter a CPU cache miss.

Further, in one or more particular embodiments, once a CPU honors a request to hold a cache line, for a corresponding store-type or update-type operand, no subsequent NIAI-hold request for a corresponding store-type or update-type operand may be honored, until after the initial request is concluded. However, the CPU may honor a request to hold a cache line for a corresponding fetch-type operand. In one or more embodiments, at any given time the processing unit or CPU may be honoring many requests to hold cache lines for corresponding operands, such as corresponding fetch-type operands. For a corresponding store-type or update-type operand that conditionally updates the operand location, the request to hold the cache line need not be honored if the cache line is not updated. An update includes when the value stored is the same as the original value. The compare and swap instruction is an example of a storage operand reference that conditionally updates the storage location.

Following an NIAI-hold with a corresponding fetch-type operand, no subsequent NIAI-release for the same cache line is required. The extended period of time a cache line is held, resulting from an NIAI-hold with a corresponding fetch-type operand, will not be terminated as a result of attempting a NIAI-release for the same cache line. Further, following NIAI-hold with a corresponding store-type or update-type operand that conditionally updates the operand location and the cache line is not updated, no subsequent NIAI-release for the same cache line need be required.

One embodiment of a flow diagram according to an embodiment is described with reference to FIG. 7. As shown, in one or more implementations, the CPU obtains an access intent instruction indicating an access intent 700. The access intent may be associated with an operand of a next sequential instruction. The access intent may also indicate usage of the operand by an instruction(s) subsequent to the next sequential instruction. The CPU then executes the access intent instruction 710. In one embodiment, the processing unit may remember the access intent by storing it internally, for example, in internal memory or an internal control register. The CPU obtains the next sequential instruction 720. The next sequential instruction is executed, and as part of the execution, processing unit behavior is controlled based on the access intent of the access intent instruction 730.

In one or more embodiments, a processing unit behavior control is described herein to selectively continue holding the corresponding cache line in private cache exclusively after completing processing of a storage operand request where the storage operand request is designated hold, and the corresponding cache line in private cache used for processing the storage operand request is owned exclusively by the processing unit. As noted, the continuing hold may include initiating a counter to facilitate the hold for a desired interval. Further, based on the access type being store-type or update-type, a subsequent storage operand request may be designated release for the corresponding cache line in order to discontinue the hold on the corresponding cache line in private cache exclusively. Identifying the storage operand request as "hold" or "release" may be accomplished, as noted above, in one or more implementations, utilizing a designated access intent code in one or more of the control fields of the access intent instruction.

Stated otherwise, when a storage operand designated hold is successfully processed, a primary result of the facility described herein is for the processing unit to reject cache invalidate commands from system control that are associated with a specific cache line held exclusively by the processing unit. A byproduct of rejecting these commands is that the corresponding cache line is held exclusively throughout the storage hierarchy by the processing unit longer than typical protocols would permit. When the extended hold interval expires, the processing unit still holds the cache line, but after the set interval expires, the processing unit resumes typical storage hierarchy protocols. In such a case, upon receipt of a cache invalidate (XI) command from system control, the processing unit will release the line from cache, and after that cache invalidate is honored, the processing unit will no longer hold the cache line.

Figure 8B:
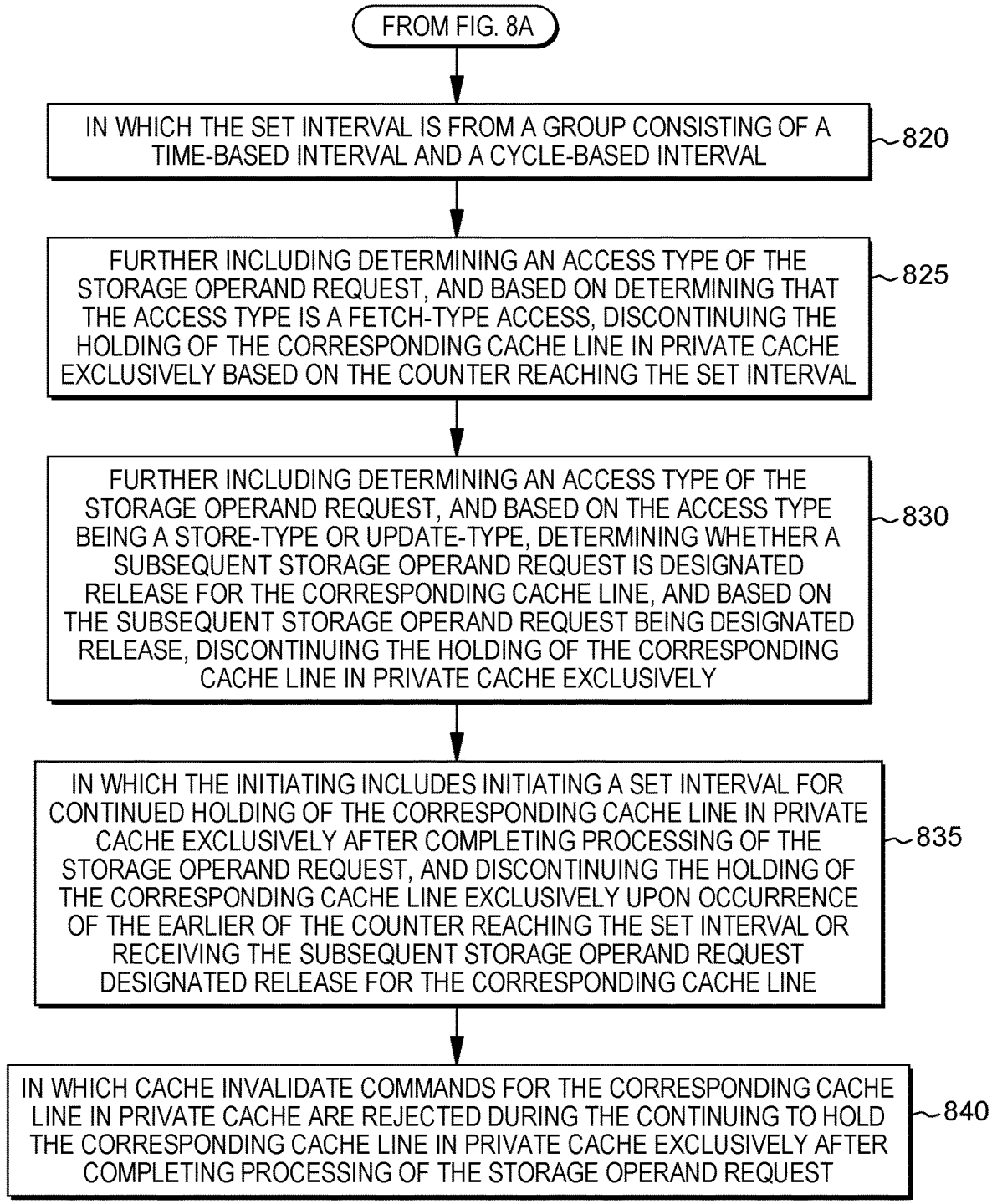

Referring to FIGS. 8A & 8B, facilitating processing within a computing environment (800), in accordance with one or more aspects of the present invention, includes: determining whether a storage operand request to a common storage location shared by multiple processing units of a computing environment is designated hold; ascertaining whether a state of a corresponding cache line in private cache used for processing the storage operand request is owned exclusively by the processing unit; and based on determining that the storage operand request is designated hold, and the state of the corresponding cache line in private cache use for processing the storage operand request is owned exclusively, continuing to hold the corresponding cache line in private cache exclusively after completing processing of the storage operand request. The continuing to hold includes initiating a counter to facilitate the continuing hold for a desired interval.

In one or more implementations, initiating the counter may include initiating a set interval for continuing holding of the corresponding cache line in the private cache exclusively after completing processing of the storage operand request, and discontinuing the holding of the corresponding cache line in private cache exclusively after the counter reaches a set interval (805). In one or more embodiments, a length of the set interval may be dependent on an access type of the storage operand request, where the access type may be a fetch-type, store-type or update-type access (810). In certain embodiments, the length of the set interval may be greater for the store-type and update-type accesses, than for a fetch-type access (815). Further, the interval may be either a time-based interval or a cycle-based interval (820).

In one or more embodiments, processing may include determining an access type of the storage operand request, and based on determining that the access type is a fetch-type access, discontinuing the holding of the corresponding cache line in private cache exclusively based on the counter reaching the set interval (825).

In one or more embodiments, the processing includes determining an access type of the storage operand request, and based on the access type being a store-type or update-type access, determining whether a subsequent storage operand request is designated release for the corresponding cache line, and based on the subsequent storage operand request being designated release, discontinuing the holding of the corresponding cache line in private cache exclusively (830). In one or more embodiments, the initiating may include initiating a set interval for a continued holding of the corresponding cache line in private cache exclusively after completing processing of the storage operand request, and discontinuing the holding of the corresponding cache line exclusively upon occurrence of the earlier of the counter reaching the set interval or receiving the subsequent storage operand request designated release for the corresponding cache line (835).

Any cache invalidate commands for the corresponding cache line in private cache are rejected during the continuing to hold the corresponding cache line in private cache exclusively after completing processing of the storage operand request (840).

Figure 9A:
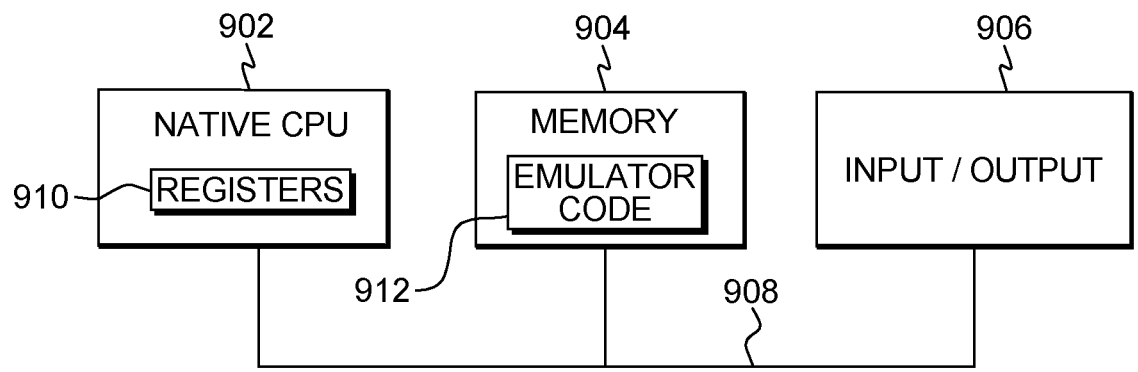
FIG. 9A depicts another example of a computing environment to incorporate and use one or more aspects of the present invention.

Another embodiment of a computing environment to incorporate and use one or more aspects is described with reference to FIG. 9A. In this example, a computing environment 900 includes, for instance, a native central processing unit (CPU) 902, a memory 904, and one or more input/output devices and/or interfaces 906 coupled to one another via, for example, one or more buses 908 and/or other connections. As examples, computing environment 900 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 902 includes one or more native registers 910, such as one or more general purpose registers and/or one or more special purpose registers used during processing within the environment. These registers include information that represent the state of the environment at any particular point in time.

Moreover, native central processing unit 902 executes instructions and code that are stored in memory 904. In one particular example, the central processing unit executes emulator code 912 stored in memory 904. This code enables the computing environment configured in one architecture to emulate another architecture. For instance, emulator code 912 allows machines based on architectures other than the z/Architecture, such as PowerPC processors, pSeries servers, HP Superdome servers or others, to emulate the z/Architecture and to execute software and instructions developed based on the z/Architecture.

Figure 9B:
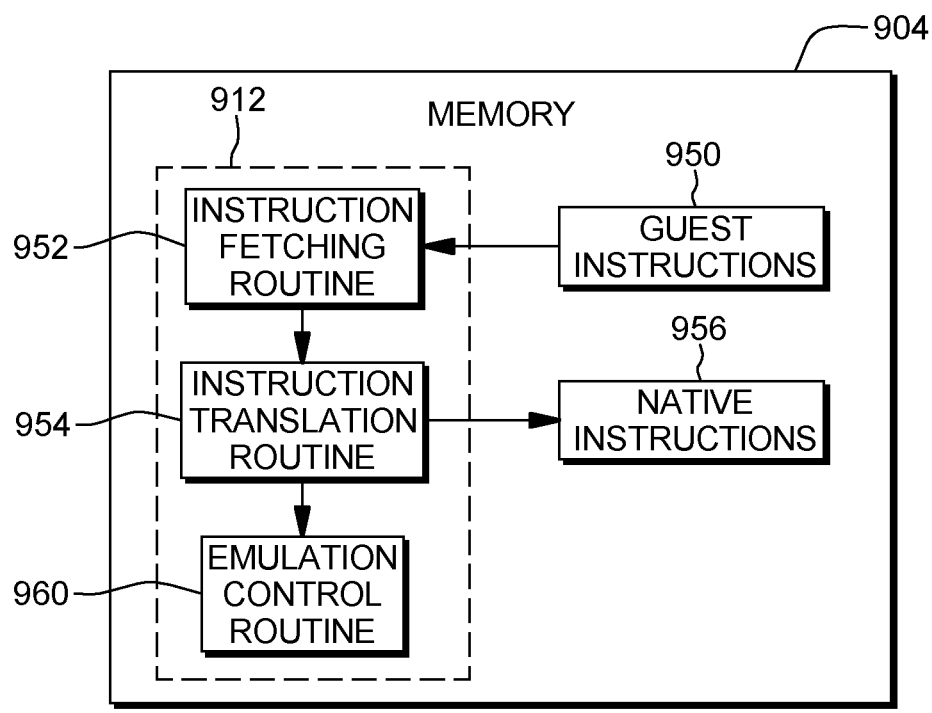
FIG. 9B depicts further details of the memory of FIG. 9A.

Further details relating to emulator code 912 are described with reference to FIG. 9B. Referring collectively to FIGS. 9A & 9B, guest instructions 950 stored in memory 904 include software instructions (e.g., correlating to machine instructions) that were developed to be executed in an architecture other than that of native CPU 902. For example, guest instructions 950 may have been designed to execute on a z/Architecture processor, but instead, are being emulated on native CPU 902, which may be, for example, an Intel Itanium II processor. In one example, emulator code 912 includes an instruction fetching routine 952 to obtain one or more guest instructions 950 from memory 904, and to optionally provide local buffering for the instructions obtained. It also includes an instruction translation routine 954 to determine the type of guest instruction that has been obtained and to translate the guest instruction into one or more corresponding native instructions 956. This translation includes, for instance, identifying the function to be performed by the guest instruction and choosing the native instruction(s) to perform that function.

Further, emulator code 912 includes an emulation control routine 960 to cause the native instructions to be executed. Emulation control routine 960 may cause native CPU 902 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 956 may include loading data into a register from memory 904; storing data back to memory from a register; or performing some type of arithmetic or logic operation, as determined by the translation routine.

Each routine is, for instance, implemented in software, which is stored in memory and executed by native central processing unit 902. In other examples, one or more of the routines or operations are implemented in firmware, hardware, software or some combination thereof. The registers of the emulated processor may be emulated using registers 910 of the native CPU or by using locations in memory 904. In embodiments, guest instructions 950, native instructions 956 and emulator code 912 may reside in the same memory or may be disbursed among different memory devices.

As used herein, firmware includes, e.g., the microcode, millicode and/or macrocode of the processor. The term includes, for instance, the hardware-level instructions and/or data structures used in implementation of higher level machine code. In one embodiment, firmware may include, for instance, proprietary code that is typically delivered as microcode that includes trusted software or microcode specific to the underlying hardware and controls operating system access to the system hardware.

A guest instruction 950 that is obtained, translated and executed is, for instance, one or more of the instructions described herein. The instruction, which is of one architecture (e.g., the z/Architecture), is fetched from memory, translated and represented as a sequence of native instructions 956 of another architecture (e.g., PowerPC, pSeries, Intel, etc.). These native instructions may then be executed.

Although various examples are provided, variations are possible without departing from a spirit of the claimed aspects. For example, values that are included in registers and/or fields used by the instruction may, in other embodiments, be in other locations, such as memory locations, etc. Many other variations are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 1.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 10:
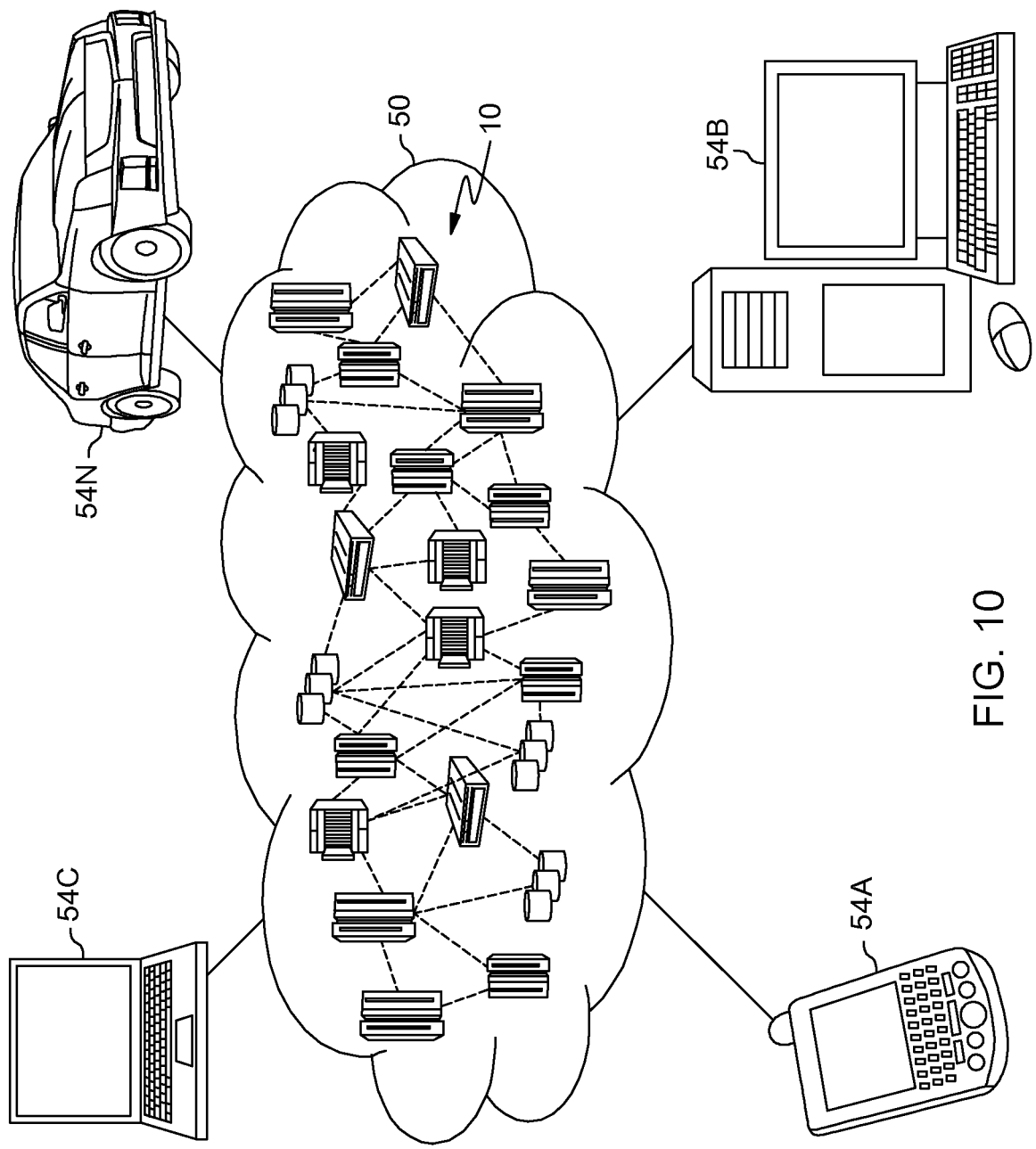
FIG. 10 depicts one embodiment of a cloud computing environment.

Referring now to FIG. 10, illustrative cloud computing environment 50 is depicted. As shown, cloud computing environment 50 comprises one or more computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
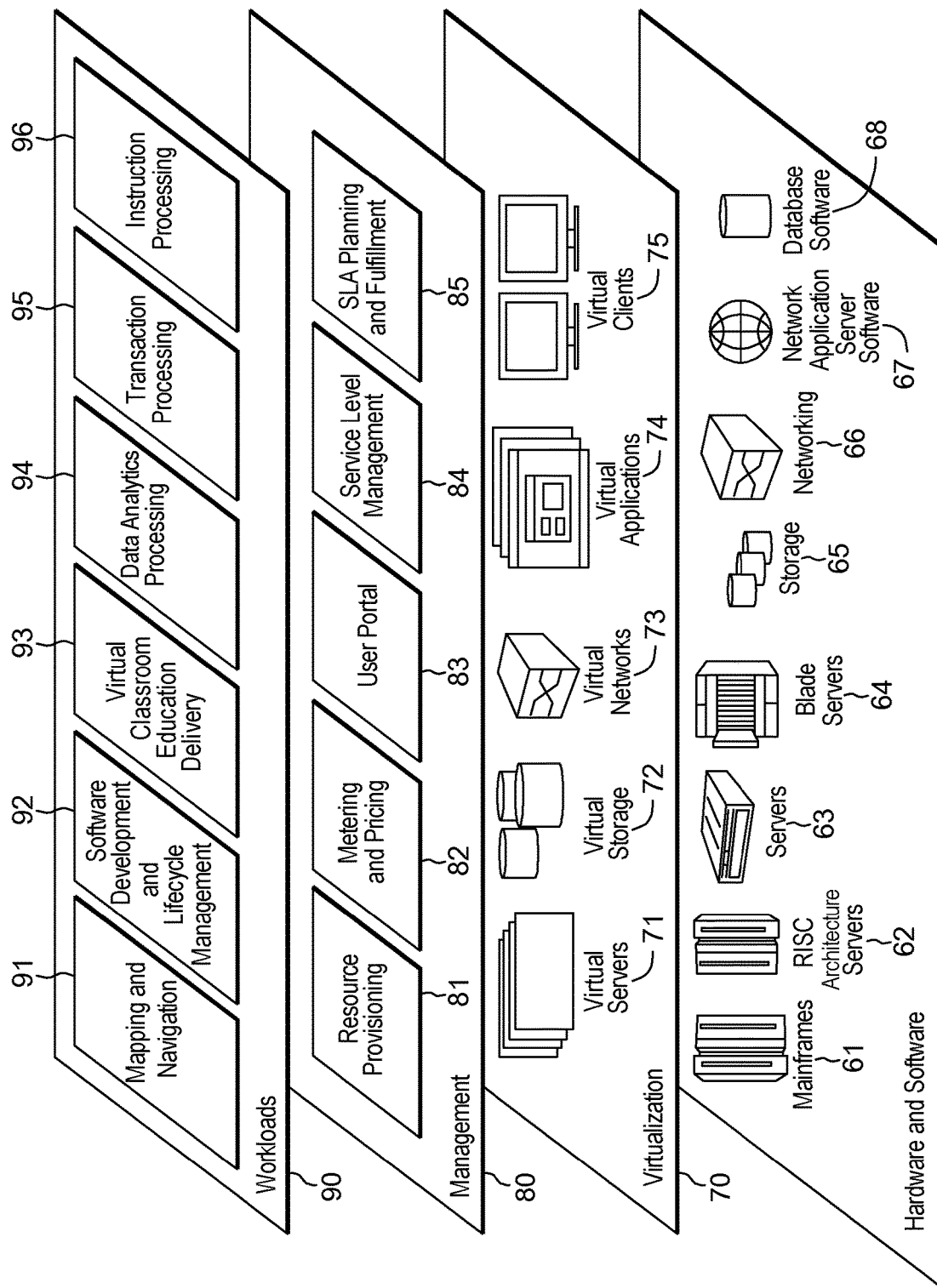
FIG. 11 depicts one example of abstraction model layers.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and instruction processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   a computer readable storage medium readable by a processing unit and storing instructions for execution by the processing unit for performing a method comprising:
      determining whether an access control field of an instruction includes a hold value, the hold value being a hold designation for a storage operand request of a subsequent instruction to a storage location shared by multiple processing units of a computing environment;
      controlling, at least in part, processing of the subsequent instruction dependent on whether the access control field of the instruction includes the hold value, the controlling comprising:
         ascertaining whether a state of a corresponding cache line in private cache used for processing the storage operand request is owned exclusively by the processing unit; and
         based on determining that the storage operand request is designated hold, and that the state of the corresponding cache line in private cache used for processing the storage operand request is owned exclusively, continuing to hold the corresponding cache line in private cache exclusively after completing processing of the storage operand request, the continuing to hold including initiating a counter to facilitate the continuing hold for a desired interval.

2. The computer program product of claim 1, wherein the initiating comprises initiating a set interval for continued holding of the corresponding cache line in private cache exclusively after completing processing of the storage operand request, and discontinuing the holding of the corresponding cache line in private cache exclusively after the counter reaches the set interval.

3. The computer program product of claim 2, wherein a length of the set interval is dependent on an access type of the storage operand request, the access type being from a group consisting of fetch-type, store-type and update-type.

4. The computer program product of claim 3, wherein the length of the set count interval is greater for the store-type and the update-type than for the fetch-type.

5. The computer program product of claim 2, wherein the set interval is from a group consisting of a time-based interval and a cycle-based interval.

6. The computer program product of claim 2, further comprising determining an access type of the storage operand request, and based on determining that the access type is a fetch-type access, discontinuing the holding of the corresponding cache line in private cache exclusively based on the counter reaching the set interval.

7. The computer program product of claim 1, further comprising determining an access type of the storage operand request, and based on the access type being a store-type or update-type, determining whether a subsequent storage operand request is designated release for the corresponding cache line, and based on the subsequent storage operand request being designated release, discontinuing the holding of the corresponding cache line in private cache exclusively.

8. The computer program product of claim 7, wherein the initiating comprises initiating a set interval for continued holding of the corresponding cache line in private cache exclusively after completing processing of the storage operand request, and discontinuing the holding of the corresponding cache line exclusively upon occurrence of the earlier of the counter reaching the set interval or receiving the subsequent storage operand request designated release for the corresponding cache line.

9. The computer program product of claim 1, wherein cache invalidate commands for the corresponding cache line in private cache are rejected during the continuing to hold the corresponding cache line in private cache exclusively after completing processing of the storage operand request.

10. A computer system for facilitating processing within a computing environment, the computer system comprising:
  a memory; and
  a processor communicatively coupled with the memory, wherein the computer system is configured to perform a method comprising;
    determining whether an access control field of an instruction includes a hold value, the hold value being a hold designation for a storage operand request of a subsequent instruction to a storage location shared by multiple processing units of a computing environment;
    controlling, at least in part, processing of the subsequent instruction by a processing unit dependent on whether the access control field of the instruction includes the hold value, the controlling comprising:
      ascertaining whether a state of a corresponding cache line in private cache used for processing the storage operand request is owned exclusively by the processing unit; and
      based on determining that the storage operand request is designated hold, and that the state of the corresponding cache line in private cache used for processing the storage operand request is owned exclusively, continuing to hold the corresponding cache line in private cache exclusively after completing processing of the storage operand request, the continuing to hold including initiating a counter to facilitate the continuing hold for a desired interval.

11. The computer system of claim 10, wherein the initiating comprises initiating a set interval for continued holding of the corresponding cache line in private cache exclusively after completing processing of the storage operand request, and discontinuing the holding of the corresponding cache line in private cache exclusively after the counter reaches the set interval.

12. The computer system of claim 11, wherein a length of the set interval is dependent on an access type of the storage operand request, the access type being from a group consisting of fetch-type, store-type and update-type.

13. The computer system of claim 12, wherein the length of the set interval is greater for the store-type and the update-type than for the fetch-type.

14. The computer system of claim 11, wherein the set interval is from a group consisting of a time-based interval and a cycle-based interval.

15. The computer system of claim 11, further comprising determining an access type of the storage operand request, and based on determining that the access type is a fetch-type access, discontinuing the holding of the corresponding cache line in private cache exclusively based on the counter reaching the set interval.

16. The computer system of claim 10, further comprising determining an access type of the storage operand request, and based on the access type being a store-type or update-type, determining whether a subsequent storage operand request is designated release for the corresponding cache line, and based on the subsequent storage operand request being designated release, discontinuing the holding of the corresponding cache line in private cache exclusively.

17. The computer system of claim 16, wherein the initiating comprises initiating a set interval for continued holding of the corresponding cache line in private cache after exclusively completing processing of the storage operand request, and discontinuing the holding of the corresponding cache line exclusively upon occurrence of the earlier of the counter reaching the set interval or receiving the subsequent storage operand request designated release for the corresponding cache line.

18. The computer system of claim 10, wherein cache invalidate commands for the corresponding cache line in private cache are rejected during the continuing to hold the corresponding cache line in private cache exclusively after completing processing of the storage operand request.

19. A computer-implemented method of facilitating processing within a computing environment, the computer-implemented method comprising:
  determining by a processor whether an access control field of an instruction includes a hold value, the hold value being a hold designation for a storage operand request of a subsequent instruction to a storage location shared by multiple processing units of a computing environment;
  controlling, at least in part, processing of the subsequent instruction by a processing unit dependent on whether the access control field of the instruction includes the hold value, the controlling comprising:
    ascertaining whether a state of a corresponding cache line in private cache used for processing the storage operand request is owned exclusively by the processing unit; and
    based on determining that the storage operand request is designated hold, and that the state of the corresponding cache line in private cache used for processing the storage operand request is owned exclusively, continuing to hold the corresponding cache line in private cache exclusively after completing processing of the storage operand request, the continuing to hold including initiating a counter to facilitate the continuing hold for a desired interval.

20. The computer-implemented method of claim 19, wherein the initiating comprises initiating a set interval for continued holding of the corresponding cache line in private cache exclusively after completing processing of the storage operand request, and discontinuing the holding of the corresponding cache line in private cache exclusively after the counter reaches the set interval.

21. The computer-implemented method of claim 20, wherein a length of the set interval is dependent on an access type of the storage operand request, the access type being from a group consisting of fetch-type, store-type and update-type.

22. The computer-implemented method of claim 21, wherein the length of the set interval is greater for the store-type and the update-type than for the fetch-type.

23. The computer-implemented method of claim 20, further comprising determining an access type of the storage operand request, and based on determining that the access type is a fetch-type access, discontinuing the holding of the corresponding cache line in private cache exclusively based on the counter reaching the set interval.

24. The computer-implemented method of claim 19, further comprising determining an access type of the storage operand request, and based on the access type being a store-type or update-type, determining whether a subsequent storage operand request is designated release for the corresponding cache line, and based on the subsequent storage operand request being designated release, discontinuing the holding of the corresponding cache line in private cache exclusively.

25. The computer-implemented method of claim 24, wherein the initiating comprises initiating a set interval for continued holding of the corresponding cache line in private cache exclusively after completing processing of the storage operand request, and discontinuing the holding of the corresponding cache line exclusively upon occurrence of the earlier of the counter reaching the set interval or receiving the subsequent storage operand request designated release for the corresponding cache line.

\* \* \* \* \*